June 30, 1931.  C. NIELOUD  1,812,016

ELECTRICALLY HEATED APPARATUS FOR DRYING COFFEE AND THE LIKE

Filed Aug. 25, 1928    2 Sheets-Sheet 1

INVENTOR
Charles NIELOUD

By Chatwin & Company
Attys.

June 30, 1931.  C. NIELOUD  1,812,016
ELECTRICALLY HEATED APPARATUS FOR DRYING COFFEE AND THE LIKE
Filed Aug. 25, 1928  2 Sheets-Sheet 2

INVENTOR:
Charles NIELOUD

By Chatwin Company
Attys.

Patented June 30, 1931

1,812,016

UNITED STATES PATENT OFFICE

CHARLES NIÉLOUD, OF MARSEILLE, FRANCE

ELECTRICALLY HEATED APPARATUS FOR DRYING COFFEE AND THE LIKE

Application filed August 25, 1928, Serial No. 302,036, and in Germany September 1, 1927.

The invention consists in a heater apparatus for drying coffee beans and the like and is characterized in that it constitutes a balance operating automatically to arrest the heating when a predetermined weight is attained and that it is heated by its external surfaces and by tubes passing through the mass of product to be dried, by means of electric current.

The object of this heater is to obtain always the same degree of drying, the regulation being effected by a certain quantity of beans or grains.

A constructional embodiment of the invention is given in the appended drawings in which:—

Figure 1:
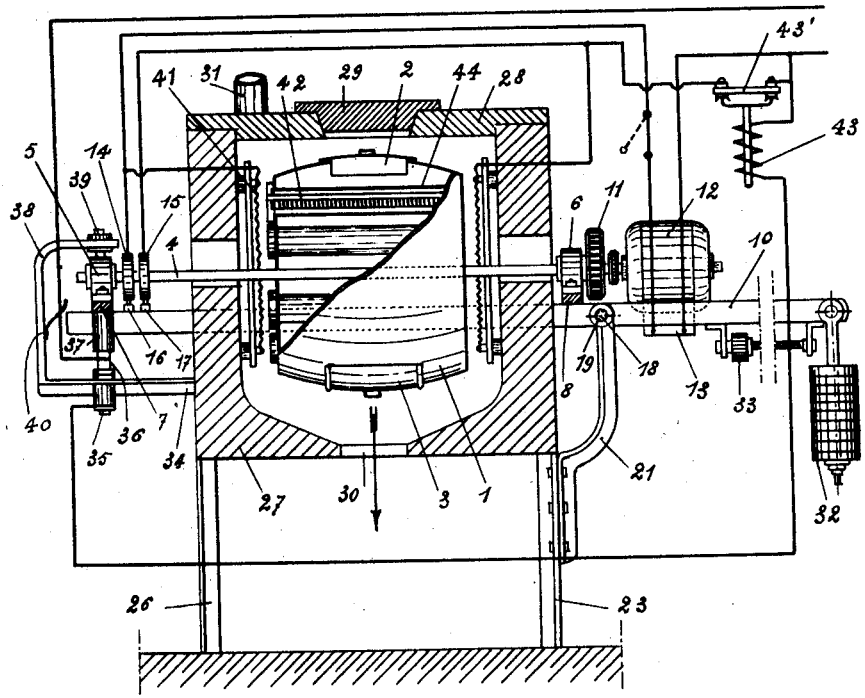
Figure 2:
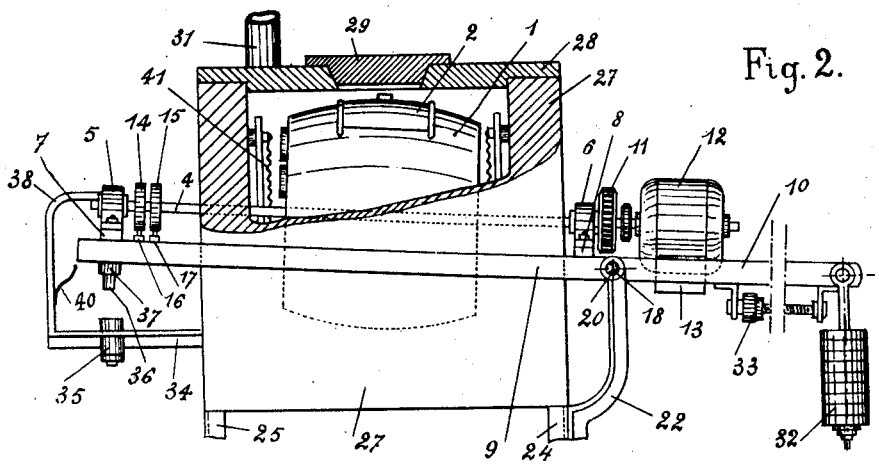
Figure 3:
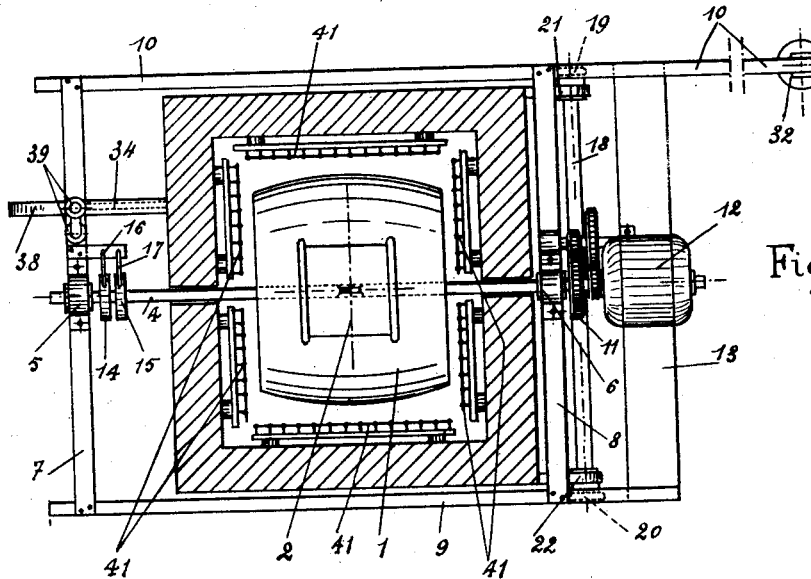
Figure 4:
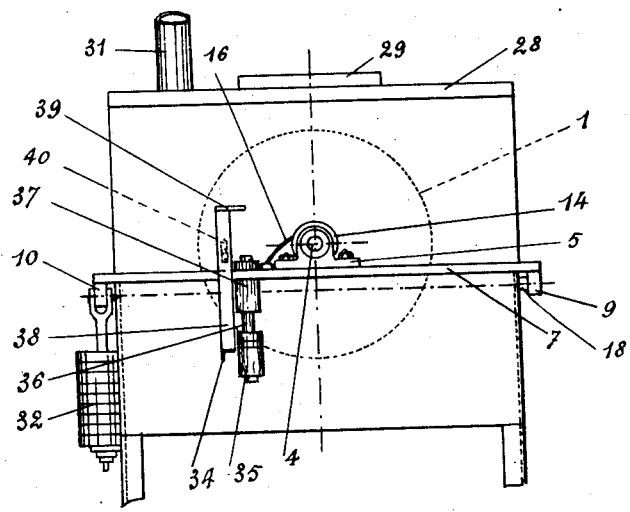

Figure 1 shows a side view with parts cut away, the heater in its working position with a diagram of the electric connections supplying the heater and actuating the motor; Fig. 2 shows the same heater in its stopping position; Fig. 3 is a plan view of the heater with the upper part removed; Fig. 4 shows a front view of the heater on the side where the contacts and switches are arranged.

The heater 1 of metal and of cylindrical shape with peripheral walls slightly curved, is provided with two openings 2 and 3 with closing means therefor, these openings serving irrespectively either for the inlet or outlet of the grains.

This heater is secured in known manner on a shaft 4 which passes through openings formed in the walls of the oven and which is carried in bearing supports 5 and 6 secured to the transverse members 7 and 8 integral with a frame consisting of two metal arms 9 and 10 interconnected and capable of oscillating around the shaft 18.

The shaft 4 carries at one of its ends, a toothed wheel 11 engaging with gear wheels for reducing the speed of the electric motor 12 mounted on a cross member 13 likewise integral with the frame 9 and 10. The other end of the shaft 4 carries rings 14 and 15 which receive the current from the brushes 16 and 17; the current is led to the interior of the tube 44 (Fig. 1) for internally heating the apparatus by electric conductors penetrating within the shaft 4.

The frame 9, 10 is carried by the shaft 18, around which it oscillates; this shaft 18 carries ball bearings 19, 20 interconnected by ball bearing abutments or otherwise pivoted as by using knife edges; the shaft 18 is supported by standards 21, 22 on feet 23 and 24 which together with the feet 25 and 26 support the oven 27 surrounding the heater 1 entirely.

The oven 27 is made of non-conducting material for the heat; it has a cover 28 with an opening adapted to be closed by a door 29 through which the grains for charging the heater can be passed, and at the opposite side has an aperture 30 for the outlet of the grains which have been dried and which aperture is closed by a door.

A flue 31 permits of the exhaust of the vapors from the interior of the oven.

The arm 10 of the frame which is longer carries the counterweight 32 and the movable weight 33 for adjustment.

An iron mounting 34 secured to one of the walls of the oven 27, carries the insulated contact 35 disposed in the extension of the contact 36, said contact being constantly pushed towards the bottom by spring action, the spring being housed in the insulated socket 37 secured on the cross piece 7. This assembly constitutes the contact controlling the stopping of the current in the coil 43 which actuates the interrupter 43' thus breaking the heating circuit.

A contact 40 operating slightly before the contact 36 leaves the contact stud 35 and momentarily actuates a warning signal or bell to indicate that the heating is about to cease.

The arm 38 secured to the iron mounting 34 carries at its upper part a contact 39 which in turn actuates a bell to indicate that the drying operation is terminated.

These contacts as well as the circuits actuating the bell signals being of the usual known type are not illustrated in the drawings.

The external resistances 41 are stationary; they are arranged on insulated mountings placed on the internal walls of the oven 27 while the internal resistances 42 are disposed radially on the vertical walls of the heater 1 such that there is a space between their cover 44 and the internal wall of the heater 1 which space permits the grains to circulate among said resistances, said grains returning by gravity to the bottom of the heater so leaving no portion of the mass being treated stationary.

The operation of the apparatus is as follows:

For a first operation and to proceed with the adjustment of the balance the quantity of grains which it is desired to dry by roasting is weighed and then the quantity is deducted which is equivalent to the weight which it is desired to remove by drying, said quantity is momentarily placed aside and then the grains are put in the heater 1 through the openings 29 and 2 (the openings 3 and 30 being naturally closed); the filling operation being completed the counterweight 32 is moved as well as the complementary counterweight 33 for adjustment purposes, so that the equilibrium around shaft 18 is gradually upset and the contact 36 becomes disengaged from the stud 35; at this moment there is added the quantity of grains which had momentarily been set at one side; this additional weight causes the frame 9, 10 to oscillate to the side carrying the heater 1 and to bring the contact 36 onto the stud 35.

The openings 2 and 29 being closed, the motor 12 is started up and through its reduction gearing rotates the wheel 11 which turns the heater 1 and the automatic interrupter 43' is closed which permits the electric current to pass through all the stationary and movable resistances.

As the drying process advances, the grains owing to the evaporation of the water which they contain, become lighter, the weight in this manner progressively modifying until balance is restored and causing the contact 36 to disengage from the stud 35 so breaking the circuit in coil 43 of the circuit breaker 43' which automatically breaks and cuts off the current from the heating resistances 41, 42; but in this lifting movement, contact 40 actuates a bell signal device warning that the apparatus will shortly stop. This is announced in turn by the operation of contact 39 which indicates that the motor 12 must be stopped and the heater discharged through the opening 30. This discharge ended, the heater is ready for a second operation for which purpose it is sufficient to introduce the total quantity required for heating.

I claim:

1. Apparatus for drying and roasting coffee and like grains, comprising a fixed oven, a movable receptacle located within said fixed oven, means for electrically heating said receptacle, a pivotally mounted frame, means for supporting said movable receptacle on said frame, an electric heating circuit, a contact on said frame connected with said circuit, a projection on said fixed oven, a contact connected with said circuit carried by said projection, the weight of material in said movable receptacle closing said contacts and means for opening said contacts when the contact carrying frame is shifted due to loss of weight of the material being roasted and means for rotating said receptacle.

2. Apparatus for drying and roasting coffee and like grains comprising a fixed oven, a movable receptacle for containing material for treatment, located within said fixed oven, an electric circuit, electrical heating means located within said movable receptacle, a pivotally mounted frame supporting said receptacle, a contact connected with said circuit, carried by said frame, an arm carried by said fixed oven, a contact connected with said electric circuit carried by said arm, a counterweight carried by said frame for separating said contacts, the weight of material in said movable receptacle causing said contacts to close and complete said electric circuit and means for rotating said movable receptacle.

3. Apparatus for drying and roasting coffee and like grains comprising a fixed oven constructed of heat insulating material, a movable receptacle adapted to contain the material for treatment, said receptacle being located within said fixed oven, an electric circuit, electrical heating means connected with said circuit located within said movable receptacle, electrical heating means connected with said circuit located upon the interior of said fixed oven, a pivotally mounted frame disposed exteriorly of said fixed oven, a support for said movable receptacle carried by said frame, an electric contact connected with said circuit carried by said frame, a projection from the fixed oven, an electric contact carried by said projection, an adjustable counterweight carried by said frame for separating said contacts, the weight of the contents of said movable receptacle acting to close said contacts and complete the heating circuit and means for rotating said movable receptacle.

CHARLES NIËLOUD.